Patented Oct. 10, 1950

2,525,353

UNITED STATES PATENT OFFICE 2,525,353

PROCESS FOR THE PRODUCTION
OF ESTERS

Chester M. Himel, Bartlesville, Okla., assignor to
Phillips Petroleum Company, a corporation of
Delaware No Drawing. Application December 18, 1946,
Serial No. 717,082

15 Claims. (Cl. 260—486)

This invention relates to a process for the production of esters. More particularly, the present invention relates to the production of chloroesters and unsaturated esters using chloronitro derivatives as starting materials.

Esters, in general, are valuable compounds in themselves and are also widely used as intermediates in the synthesis of numerous materials. Compounds belonging to the class known as chloroesters are particularly important, especially by virtue of the presence of the halogen atom which will undergo many reactions with different substances to yield a variety of products. Chloroesters may be used directly as solvents, plasticizers, insecticides, insecticide synergists, and as intermediates in the manufacture of important substances such as other insecticides, surface active agents and resinous materials. The unsaturated esters such as, for example, methyl methacrylate which may be derived from 1-nitro-2-chloroisobutane by treatment with methyl alcohol followed by dehydrohalogenation, as described herein, find uses as synthetic rubber additives, as monomers or comonomers in polymerization systems, etc.

It is, therefore, an object of the present invention to provide a process for the preparation of esters. It is a further object of the present invention to provide a process for the production of chloroesters by the interaction of alcohols with chloronitro derivatives of hydrocarbons containing olefinic groups such as monoolefins or diolefins, which contain a double bond attached to a terminal carbon atom. It is a still further object of the present invention to provide a process for the production of unsaturated esters by the reaction of alcohols with chloronitro derivatives of olefinic materials such as monoolefins or diolefins.

In accordance with the present invention, I have found that when alcohols are brought into contact with the products formed from the interaction of nitryl chloride with olefinic materials of the type described, chloroesters are obtained in substantial yields with the concomitant formation of the corresponding unsaturated ester in small quantities. However, through regulating esterification conditions larger amounts of the unsaturated esters may be produced. A change in the reaction conditions will effect a change in the ratio of reaction products and, in some cases, conditions may be regulated in such a way that large quantities of the chloroester are obtained with almost negligible amounts of the unsaturated compound being formed. Also, if desired, a dehydrohalogenation reaction may be carried out simultaneously, and the chloroester substantially completely converted to the unsaturated product. Thus the quantity and type of products resulting from this reaction are governed by the choice of reaction conditions.

The process described herein is applicable to chloronitro compounds of the general formula

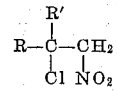

wherein R may be an alkyl, alkenyl, aryl, cycloalkyl and aralkyl radical, or a substituted derivative thereof and R' is hydrogen, alkyl, alkenyl, cycloalkyl, aryl, or an aralkyl radical. These radicals may be alike or may comprise any combination of the different groups mentioned herein. It is obvious from the general formula given above that the chloronitro compounds of this invention are derivatives of olefinic hydrocarbons with the double bond occurring on the terminal carbon atom. These compounds may be readily converted to esters by interaction with alcohols, the reaction conditions varying somewhat with the particular reactants selected.

In the practice of this invention it is advantageous to use the nitryl chloride adduct as the starting material rather than the pure chloronitro compound. For example, three types of products appear when nitryl chloride reacts with monoolefins: the nitryl chloride may serve as a chlorinating agent to yield a dichloro derivative as the chief product; the nitryl chloride may undergo decomposition to produce nitrogen tetroxide which, in turn, undergoes reaction with the double bond to yield a compound containing —ONO and —NO$_2$ groups, respectively, on adjacent carbon atoms; the reaction may proceed in the direction which gives a chloronitro compound. The temperature at which the nitryl chloride-monoolefin reaction is effected, together with other factors such as variations in pressure and the presence or absence of a diluent, determine which product or products will predominate. Therefore, in any given reaction system, it is possible to determine optimum conditions for the production of the desired material. I prefer to carry out the reaction under conditions which yield the chloronitro compound as the principal product. However, small quantities of the two other types of compounds are usually formed. After fractionation to remove the dichloro derivative, the remaining mixture is employed for the esterification reaction. While the course of the reaction is not thoroughly understood, the use of the mixture, referred to as the monoolefin-nitryl chloride adduct, is preferred since it appears that both compounds are converted, at least in part, to esters. As starting materials for the present process the products obtained in accordance with my copending application Serial No. 717,081 filed of even date herewith, now Patent No. 2,511,915 entitled "Production of Chloronitro Compounds" may be utilized.

In a more specific embodiment the process of this invention comprises the addition of an acid catalyst, such as dry hydrogen chloride gas or sulfuric acid, to the monoolefin-nitryl chloride adduct contained in any suitable reaction vessel provided with a conventional stirring or agitating means. The catalyst is introduced slowly until a slight molar excess is present. The exothermic nature of the reaction is evidenced by an increase in the temperature of the reactor contents during the addition of the acid. When a more active catalyst such as sulfuric acid is employed, it is important that the temperature be carefully controlled since excessive temperatures are likely to result in the formation of large quantities of tarry materials. Subsequent to the addition of the catalyst the reaction mixture is allowed to cool after which the alcohol is charged to the reactor and the contents refluxed for several hours. When hydrogen chloride is employed as the catalyst, the stream is shut off while the reaction mixture is cooled and the alcohol is added but the gas is again passed into the reaction mixture during the refluxing operation. In some cases when a higher temperature is desired the mixture is heated in a closed system until the reaction is considered complete. Upon completion of the reaction, hydroxylamine hydrochloride crystallizes and is separated by any convenient means such as filtration. The remaining material is water washed, extracted with ether and distilled.

The alcohols which are employed in the preparation of the esters of this invention may be aliphatic, cycloaliphatic, or aromatic-aliphatic and include compounds in a rather wide molecular weight range. Such alcohols are, in general, those of the non-phenolic type, or in other words, those in which the hydroxy group or groups are attached to an alkyl, cycloalkyl or aryl substituted alkyl radical. Such alcohols include methyl, ethyl, isopropyl, n-butyl, amyl, octyl, and other primary and secondary aliphatic alcohols. Also cycloaliphatic alcohols such as cyclopentanol, cyclohexanol, and aralkyl alcohols, such as benzyl alcohol and phenylethyl alcohol. When the lower molecular weight aliphatic alcohols such as methyl alcohol are used, an excellent method for the synthesis of unsaturated esters such as methyl methacrylate is provided.

The olefinic compounds used as starting materials in the present process include propylene, 1-butene, isobutylene, allyl-benzene, 2-methyl pentene-1, butadiene-1,3, butadiene-1,2, styrene, cyclohexene, etc.

Catalysts which are applicable in the present process are generally of the acid type and are preferably mineral acids such as hydrochloric, sulfuric and phosphoric. However, other acids may be utilized such as, for example, sulfonic acids but these materials require higher reaction temperatures and are, therefore, somewhat undesirable in cases where decomposition products are likely to result.

In view of the wide variation in properties of the olefinic materials employed in the preparation of the monoolefin-nitryl chloride adducts, operating temperatures for the esterification reaction, will be found to show considerable variation.

When a nitryl chloride-isobutylene adduct is employed, the temperature is generally held within the range of 0 to about 30° C. during the slow addition of the catalyst, particularly if said catalyst is one of the more active materials such as sulfuric acid. However, when a less active catalyst is employed, the temperature may be allowed to rise to 60° C. or even higher. Upon addition of the alcohol the temperature is allowed to increase and is generally held within the range of 65 to 125° C. when a low molecular weight alcohol such as methyl alcohol is used. It is to be understood, however, that operating temperatures must necessarily be varied depending upon both the nitryl chloride-monoolefin adduct and the alcohol selected. In general the temperature must be adjusted to a level such that the desired conversion is realized and the formation of decomposition products is held at a minimum.

Operating pressures may vary from atmospheric to low superatmospheric, for example, up to about 500 pounds per square inch gage. Generally atmospheric pressure is considered sufficient for satisfactory operation of the process. However, when the reactor contents include one or more volatile components, it is often considered advantageous to operate under slightly elevated pressures.

The reaction time will vary depending upon the reactants chosen for the synthesis of the ester, the temperature, the pressure and the catalyst. A reaction period of about six to about twenty-four hours is usually considered adequate after the alcohol is added but a longer time may sometimes be required to effect the desired conversion.

The reactions may be said to proceed in accordance with the following equations which illustrate the path of reaction where the chloronitro compound is formed and utilized as the principal reactant.

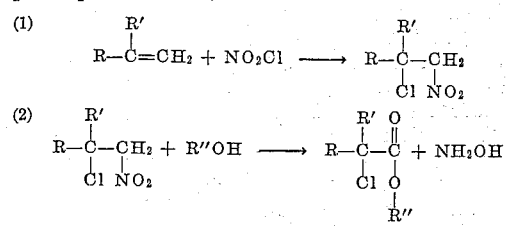

where R is an alkyl, alkenyl, cycloalkyl, aryl or aralkyl radical or a substituted derivative thereof, R' is hydrogen, alkyl, alkenyl, cycloalkyl, aryl, or an aralkyl radical, while R" represents an alkyl, cycloalkyl, or aryl substituted alkyl radical.

Esters of the foregoing type in which R and/or R' are attached through a carbon atom having at least one hydrogen atom attached thereto, may be dehydrohalogenated to form the corresponding unsaturated ester containing the structure

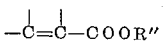

Dehydrohalogenation is carried out in a conventional manner. For example, methyl alpha chloroisobutyrate is dissolved in methyl phthalate and catalytic quantities of anhydrous fused zinc chloride are added (one gram per hundred grams of ester is usually sufficient). The reaction mixture is heated in the kettle of a distilling column until a steady evolution of hydrogen chloride and methyl methacrylate occurs. The yield of methyl methacrylate is in the range of about eighty per cent. In the formation of methyl alpha chloroisobutyrate and methyl methacrylate from 1-nitro-2-chloroisobutane, the relative proportions of these products is dependent upon the severity of the reaction conditions. At temperatures in the neighborhood of 70° C. and at contact times of 12 hours or more the ratio is about sixty per cent chloroester to about forty per cent unsaturated ester.

*Examples*

I

A monoolefin-nitryl chloride adduct was prepared by the interaction of nitryl chloride and isobutylene in the presence of chloroform as a solvent. Chloroform (200 ml.) and 3.75 mols isobutylene were charged to a reactor which was cooled to —18° C. and stirred during the addition of 2.20 mols nitryl chloride. The temperature varied from —18 to —12° C. as the reaction proceeded. Upon completion of the reaction the chloroform was removed in vacuo and the remaining material fractionated.

A fraction of the isobutylene-nitryl chloride adduct boiling at 29–34° C./2 mm., comprising 50 grams of the material, was charged to a reaction flask and stirred during the addition of dry hydrogen chloride gas. The temperature rose to 50 to 60° C. and then subsided after which 30 grams of methanol was introduced into the reactor. Hydrogen chloride gas was passed into the reaction mixture while it was refluxed at 70 to 85° C. for twelve hours. Hydroxylamine hydrochloride (12 grams) separated and was removed by filtration. The remaining material was washed with water, extracted with ether and distilled. The yield of esters obtained was 42 grams.

II

One mol of an isobutylene-nitryl chloride adduct which had been fractionated to remove the dichloro derivative was charged to a reaction flask and stirred while dry hydrogen chloride gas was introduced until the material was saturated. Methanol (1.1 mols) was added and the reaction mixture was then heated to 70° C. for 18 hours. During this period stirring was continued. Upon completion of the reaction the mixture was washed with water and diluted with 400 cc. ether. Fractionation of the ether extract yielded a mixture of methyl-alpha-chloro-isobutyrate,

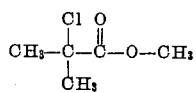

and methyl methacrylate,

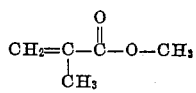

III

To 450 grams of an isobutylene-nitryl chloride adduct free from 1,2-dichloro-isobutane, 310 grams of concentrated sulfuric acid was added slowly while the reaction mixture was stirred and the temperature held at 20 to 30° C. When no further increase in temperature was observed 200 grams of methanol was added slowly and the mixture refluxed, with stirring, at 70–80° C. for twelve hours. The reaction mixture was washed with water, extracted with ether and distilled to obtain a mixture of the alpha-chloro and the unsaturated esters.

I claim:

1. A process for the preparation of esters which comprises contacting the addition product of an olefinic hydrocarbon having the olefinic linkage attached to a terminal carbon atom and nitryl chloride, with an alcohol selected from the group consisting of aliphatic, cycloaliphatic, and aromatic-aliphatic alcohols in the presence of a mineral acid catalyst and at a temperature below that at which substantial yields of tarry materials are produced.

2. A process for the preparation of esters which comprises contacting the adduct of a monoolefin having a double bond attached to a terminal carbon atom and nitryl chloride, with an alcohol selected from the group consisting of aliphatic, cycloaliphatic, and aromatic-aliphatic alcohols in the presence of a mineral acid catalyst and at a temperature below that at which substantial yields of tarry materials are produced.

3. A process for the preparation of esters which comprises contacting the adduct of a monoolefin having a double bond attached to a terminal carbon atom having the type formula $$\begin{array}{c} R' \ H \\ | \ \ | \\ R-C-C-NO_2 \\ | \ \ | \\ Cl \ H \end{array}$$

where R represents alkyl, alkenyl, cycloalkyl, aryl or an aralkyl radical and R' represents hydrogen, alkyl, alkenyl, cycloalkyl, aryl, or an aralkyl radical; with a hydroxyl compound having the type formula R'' OH where R'' represents an alkyl, cycloalkyl or aryl substituted alkyl radical; in the presence of a mineral acid catalyst and at a temperature below that at which substantial yields of tarry materials are produced.

4. A process according to claim 3 wherein the catalyst is hydrochloric acid.

5. A process according to claim 3 wherein the catalyst is concentrated sulfuric acid.

6. A process for the preparation of esters from monoolefins having a terminal double bond which comprises adding nitryl chloride to said monoolefin to form an adduct thereof comprising the corresponding chloronitro compound, and esterifying said chloronitro compound by contacting same with an alcohol selected from the group consisting of aliphatic, cycloaliphatic and aromatic-aliphatic alcohols in the presence of a mineral acid catalyst and at a temperature below that at which substantial yields of tarry materials are produced.

7. A process for the preparation of a chloroester which comprises contacting a chloronitro compound obtained by the addition of nitryl chloride to a monoolefin having a terminal double bond, with an alcohol selected from the group consisting of aliphatic, cycloaliphatic and aromatic-aliphatic alcohols in the presence of a mineral acid catalyst and at a temperature below that at which substantial yields of tarry materials are produced.

8. A process for the preparation of unsaturated esters which comprises contacting a chloronitro compound obtained by the addition of nitryl chloride to an olefinic material having a double bond attached to a terminal carbon atom, with an alcohol selected from the group consisting of aliphatic, cycloaliphatic, and aromatic-aliphatic alcohols in the presence of a mineral acid catalyst and at a temperature below that at which substantial yields of tarry materials are produced, splitting off hydrogen chloride, and separating the unsaturated ester so produced from the other reaction products.

9. A process for the preparation of chloroesters and unsaturated esters which comprises contacting a nitryl chloride adduct formed by adding nitryl chloride to an olefinic hydrocarbon having a double bond attached to the terminal carbon atom with an alcohol selected from the group consisting of aliphatic, cycloaliphatic and aromatic-aliphatic alcohols in the presence of an acid catalyst to form the corresponding chloroester, and subjecting said chloroester to elevated temperatures to effect at least partial dehydrohalogenation.

10. A process for the preparation of esters from monoolefins in which the double bond is attached to a terminal carbon atom which comprises adding nitryl chloride to said monoolefins to form a mixed product comprising a dichloro derivative and a chloronitro derivative, separating the dichloro derivative from the mixture, and contacting the remaining mixture comprising said chloronitro derivative with an alcohol selected from the group consisting of aliphatic, cycloaliphatic, and aromatic-aliphatic alcohols in the presence of a mineral acid catalyst and at a temperature below that at which substantial yields of tarry materials are produced to effect esterification of said chloronitro derivative.

11. A process for the preparation of an alkyl-alpha-chloroisobutyrate which comprises contacting an isobutylene-nitryl chloride adduct with an aliphatic alcohol in the presence of a mineral acid catalyst at a temperature in the approximate range 65° to 125° C.

12. A process for the preparation of an alkyl methacrylate which comprises contacting an isobutylene-nitryl chloride adduct with an aliphatic alcohol in the presence of a mineral acid catalyst at a temperature in the approximate range of 65° to 125° C. and splitting off hydrogen chloride from the product of the esterification reaction.

13. A process for the preparation of methyl-alpha-chloroisobutyrate which comprises contacting an isobutylene-nitryl chloride adduct with methyl alcohol in the presence of a mineral acid catalyst at a temperature in the approximate range of 65° to 125° C.

14. A process for the preparation of methyl methacrylate which comprises contacting the adduct of isobutylene and nitryl chloride with methyl alcohol in the presence of a mineral acid catalyst and at a temperature in the approximate range 65° to 125° C. and splitting off hydrogen chloride from the product of esterification thus obtained.

15. A process for the preparation of esters which comprises contacting the addition product of an aliphatic hydrocarbon, having the olefinic linkage attached to a terminal carbon atom, and nitryl chloride with an aliphatic alcohol in the presence of a mineral acid catalyst and at a temperature sufficient to cause the reaction to proceed.

CHESTER M. HIMEL.

REFERENCES CITED

The following references are of record in the file of this patent:

UNITED STATES PATENTS

| Number | Name | Date |
|---|---|---|
| 2,020,685 | Izard | Nov. 12, 1935 |
| 2,028,012 | Reid | Jan. 14, 1936 |
| 2,265,993 | Beckham | Dec. 16, 1941 |

OTHER REFERENCES

Steinkopf et al., "Nitrierung mit Nitrylchlorid," Ber. Deut. Chem. vol. 75B, pgs. 1323–1330 (1942).